(12) United States Patent
Iwazaki et al.

(10) Patent No.: US 11,811,330 B2
(45) Date of Patent: Nov. 7, 2023

(54) CONVERTER DEVICE, MOTOR DRIVE DEVICE AND AIR CONDITIONER

(71) Applicant: Mitsubishi Electric Corporation, Tokyo (JP)

(72) Inventors: Kenji Iwazaki, Tokyo (JP); Koichi Arisawa, Tokyo (JP); Takuya Shimomugi, Tokyo (JP); Satoru Ichiki, Tokyo (JP); Keisuke Uemura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 327 days.

(21) Appl. No.: 17/423,514

(22) PCT Filed: Mar. 11, 2019

(86) PCT No.: PCT/JP2019/009724
§ 371 (c)(1),
(2) Date: Jul. 16, 2021

(87) PCT Pub. No.: WO2020/183575
PCT Pub. Date: Sep. 17, 2020

(65) Prior Publication Data
US 2022/0085730 A1    Mar. 17, 2022

(51) Int. Cl.
*H02M 7/12* (2006.01)
*H02P 23/28* (2016.01)
*F24F 11/88* (2018.01)

(52) U.S. Cl.
CPC .............. *H02M 7/12* (2013.01); *F24F 11/88* (2018.01); *H02P 23/28* (2016.02)

(58) Field of Classification Search
CPC ...... H02M 7/12; H02M 1/0012; H02M 3/157; H02M 1/4225; H02M 1/0009;
(Continued)

(56) References Cited

U.S. PATENT DOCUMENTS 9,059,657 B2 * 6/2015 Maekawa ............. H02P 27/085
10,693,377 B2   6/2020 Kutsuki et al.
2017/0288578 A1  10/2017 Kanamori et al.

FOREIGN PATENT DOCUMENTS

JP    2002-17088 A    1/2002
JP    2014-176273 A   9/2014
(Continued)

OTHER PUBLICATIONS

International Search Report of the International Searching Authority dated Apr. 23, 2019 for the corresponding International application No. PCT/JP2019/009724 (and English translation).

*Primary Examiner* — David Luo
(74) *Attorney, Agent, or Firm* — POSZ LAW GROUP, PLC (57) ABSTRACT

A converter device includes: a power conversion circuit including a reactor and a switching element, rectifying a voltage of alternating-current power supplied from an alternating-current power supply to a direct-current voltage, and boosting and outputting the direct-current voltage; a current detector detecting a current flowing in the reactor; a filter circuit filtering a first signal detected by the current detector; and a control unit generating a control signal on the basis of a carrier and a second signal generated by the filter circuit and controlling, on the basis of the control signal and with a first period, the switching element, the first period being a period of the carrier. The filter circuit cuts off a repetition frequency component in the first period and passes a repetition frequency component in a second period, the second period being longer than the first period.

8 Claims, 5 Drawing Sheets

(58) Field of Classification Search
CPC ....... F24F 11/88; H02P 23/28; H02P 2201/09; H02P 27/08; Y02B 70/10
USPC ...................................... 318/722, 720, 700
See application file for complete search history.

(56) References Cited

FOREIGN PATENT DOCUMENTS

| | | |
|---|---|---|
| JP | 2017-188989 A | 10/2017 |
| WO | 2017145303 A1 | 8/2017 |

* cited by examiner

CONVERTER DEVICE, MOTOR DRIVE DEVICE AND AIR CONDITIONER

CROSS REFERENCE TO RELATED APPLICATION

This application is a U.S. national stage application of International Patent Application No. PCT/JP2019/009724 filed on Mar. 11, 2019, the disclosure of which is incorporated herein by reference.

TECHNICAL FIELD

The present invention relates to a converter device that converts alternating-current power into direct-current power, and a motor drive device and an air conditioner including the converter device.

BACKGROUND

There is a converter device that converts supplied alternating-current power into direct-current power and outputs the direct-current power by using a rectifier circuit including a diode and a booster circuit including a switching element. This type of converter device can perform a boosting operation to boost a rectified voltage by turning on and off the switching element while rectifying the alternating-current power.

In order to control the switching element of the booster circuit in the converter device, information on a current flowing in the booster circuit is required. Therefore, the booster circuit includes a current detector in a preceding stage of the booster circuit or in the circuit. A detection signal of the current detector is transmitted to a processor. The processor controls the on/off of the switching element of the booster circuit on the basis of the detection signal of the current detector.

In recent years, switching elements capable of high-speed operation are attracting attention. Examples thereof include a metal oxide semiconductor field effect transistor (MOSFET) made with a wide band gap (KEG) semiconductor such as silicon carbide, gallium nitride, gallium oxide or diamond, and a high electron mobility transistor (HEMT). With the advent of these switching elements, increasing a switching speed has become a trend even in booster circuits. Due to the increased switching speed, a detection signal of a current detector includes many unnecessary frequency components containing noise. Therefore, removing unnecessary frequency components from such a detection signal to obtain an accurate current value is one of key techniques.

Patent Literature 1 below discloses an overcurrent protection device in a motor drive circuit that performs variable speed control of a motor, the overcurrent protection device including a filter circuit that filters a voltage generated by a direct current flowing in the motor drive circuit.

PATENT LITERATURE

Patent Literature 1: Japanese Patent Application Laid-open No. 2014-176273

Since an object of Patent Literature 1 is overcurrent protection, the essence of the technique is to reduce noise contained in a detection voltage. Accordingly, in a case where the technique of Patent Literature 1 is used for current detection of a converter device, a filter characteristic of a filter circuit may not be set appropriately. If the filter characteristic of the filter circuit is not set appropriately, the detection accuracy of a current value may be reduced. If control is performed by a current value with reduced detection accuracy, there arises a problem that an operation of the converter device becomes unstable.

SUMMARY

The present invention has been made in view of the above, and an object thereof is to obtain a converter device capable of preventing reduction in detection accuracy of a current value and stabilizing the operation.

A converter device according to the present invention includes: a power conversion circuit including a reactor and at least one switching element, the power conversion circuit converting a voltage of alternating-current power supplied from an alternating-current power supply into a direct-current voltage, and outputting the direct-current voltage; and a current detector detecting a current flowing in the reactor or the switching element. In addition, the converter device includes a filter circuit filtering a first signal detected by the current detector. Furthermore, the converter device includes a control unit generating a control signal on the basis of a carrier and a second signal generated by the filter circuit and controlling, on the basis of the control signal and with a first period, the switching element, the first period being a period of the carrier. The filter circuit cuts off a repetition frequency component in the first period and passes a repetition frequency component in a second period, the second period being longer than the first period.

The converter device according to the present invention achieves an effect that it is possible to prevent reduction in the detection accuracy of the current value and to stabilize the operation.

DETAILED DESCRIPTION

Hereinafter, the converter device, the motor drive device, and the air conditioner according to each embodiment of the present invention will be described in detail with reference to the accompanying drawings. The present invention is not limited by the following embodiments.

First Embodiment

Figure 1:
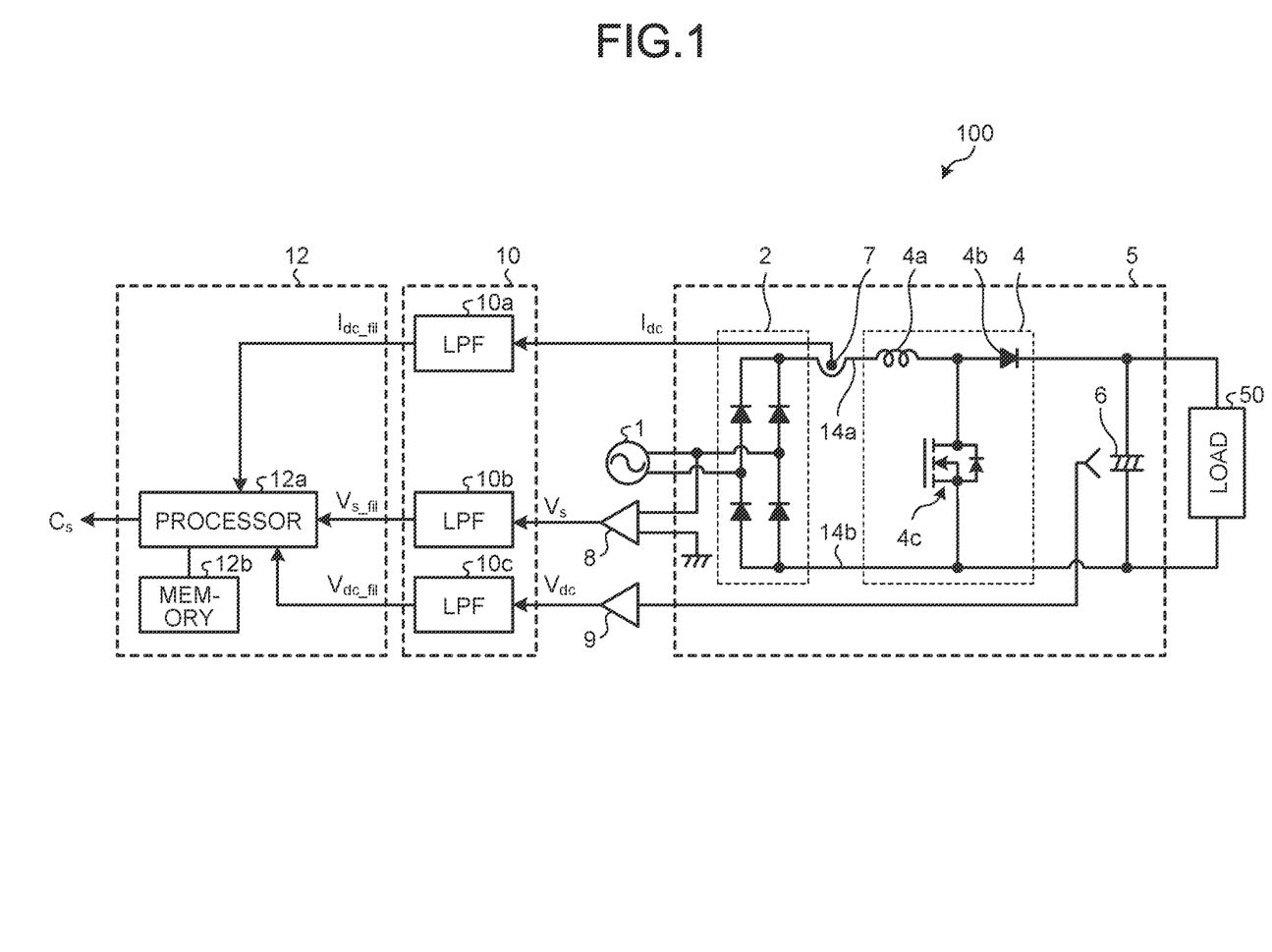
FIG. 1 is a diagram illustrating an example configuration of a converter device according to a first embodiment.

FIG. 1 is a diagram illustrating an example configuration of a converter device 100 according to a first embodiment.

The converter device 100 according to the first embodiment includes a power conversion circuit 5 that rectifies a voltage of alternating-current power supplied from an alternating-current power supply 1, and boosts and supplies the rectified direct-current voltage to a load 50. The power conversion circuit 5 is a circuit that rectifies a voltage of alternating-current power supplied from the alternating-current power supply 1 to a direct-current voltage, and boosts and outputs the direct-current voltage. The power conversion circuit 5 includes a rectifier circuit 2, a booster circuit 4, and a smoothing capacitor 6. The load 50 includes an inverter device to which power is supplied from the converter device 100, and a motor driven by the inverter device.

The rectifier circuit 2 includes four bridge-connected diodes. The rectifier circuit 2 rectifies an alternating-current voltage output from the alternating-current power supply 1.

The rectified voltage rectified by the rectifier circuit 2 is applied co the booster circuit 4. The booster circuit 4 boosts the rectified voltage output from the rectifier circuit 2. The smoothing capacitor 6 smoothes the boosted voltage output from the booster circuit 4. The voltage smoothed by the smoothing capacitor 6 is applied to the load 50.

The booster circuit 4 includes a reactor 4a, a backflow-preventing diode 4b, and a switching element 4c. The switching element 4c includes a diode connected in antiparallel between a drain as one end of the switching element 4c and a source as the other end thereof. The antiparallel connection means that a drain of a MOSFET and a cathode of the diode are connected, and a source of the MOSFET and an anode of the diode are connected. As the diode, a parasitic diode included in the MOSFET may be used. Parasitic diodes are also called body diodes.

The MOSFET illustrated in the figure is an example of the switching element 4c, but an insulated gate bipolar transistor (IGBT) may be used. The MOSFET is generally a Si-MOSFET made with a silicon (Si)-based material, but it is preferable to use a WBG-MOSFET made with a WBG semiconductor. If the WBG-MOSFET is used, switching control for the switching element 4c can be speeded up. Alternatively, the HEMT described above may be used instead of the WBG-MOSFET.

The WBG-MOSFET has a high di/dt, which is a rising characteristic of a current at a time of switching. Therefore, switching loss, which is power loss occurring when the current rises, is reduced. Accordingly, if the WBG-MOSFET is used, power consumption in the booster circuit 4 can be reduced.

In addition, withstand voltage and heat resistance of BG semiconductors in general are higher than those of silicon semiconductors. Therefore, use of the WBG-MOSFET increases withstand voltage resistance and allowable current density of the switching element 4c, and makes it possible to reduce the sine of a semiconductor module including the switching element 4c incorporated therein.

The switching element 4c and the smoothing capacitor 6 are connected so as to extend between positive and negative sides of an output end of the rectifier circuit 2. In the rectifier circuit 2, regarding the four bridge-connected diodes, an upper side where the cathodes are abutted and connected is a positive side, and a lower side where the anodes are abutted and connected is a negative side. The reactor 4a is arranged so as to connect the output end on a positive side of the rectifier circuit 2 and one end of the switching element 4c in an electrical wiring line 14a on a positive side of the output end of the rectifier circuit 2.

The backflow-preventing diode 4b is arranged so that an anode is connected to one end of the switching element 4c and a cathode is connected to one end of the smoothing capacitor 6. That is, the backflow-preventing diode 4b is connected so that a current flows from the positive side of the rectifier circuit 2 to the positive side of the smoothing capacitor 6. With this connection, a current from the positive side of the smoothing capacitor 6 to the positive side of the rectifier circuit 2 is prevented by the backflow-preventing diode 4b. The backflow-preventing diode 4b may be arranged so that the cathode is connected to the other end of the switching element 4c and the anode is connected to the other end of the smoothing capacitor 6. Electrical wiring lines 14a and 14b are sometimes called direct-current bus lines.

The converter device 100 further includes a signal processing circuit 10 and a control unit 12. Furthermore, a current detector 7, a voltage detector 8, and a voltage detector 9 are arranged in the converter device 100. The signal processing circuit 10 includes filter circuits 10a, 10b, and 10c. The control unit 12 includes a processor 12a and a memory 12b. An example of the filter circuits 10a, 10b, and 10c is a low pass filter (LPF) illustrated in the figure.

The current detector 7 detects a current flowing in the reactor 4a. An example of the current detector 7 is a current transformer (CT). A reactor current detection signal $I_{dc}$ is input to the filter circuit 10a. The reactor current detection signal $I_{dc}$ may be referred to as a "first signal". The filter circuit 10a performs filtering, which will be described later, on the reactor current detection signal $I_{dc}$. Details of the filtering by the filter circuit 10a will be described later. A filtered detection signal $I_{dc\_fil}$ is input to the processor 12a. The detection signal $I_{dc\_fil}$ may be referred to as a "second signal".

The voltage detector 8 detects an output voltage of the alternating-current power supply 1. The output voltage of the alternating-current power supply 1 is appropriately referred to as a "power supply voltage". A power supply voltage detection signal $V_s$ is input to the filter circuit 10b. The filter circuit 10b removes noise contained in the power supply voltage detection signal $V_s$. A filtered detection signal $V_{s\_fil}$ is input to the processor 12a.

The voltage detector 9 detects a voltage of the smoothing capacitor 6. A voltage boosted by the booster circuit 4 is smoothed and held in the smoothing capacitor 6. The voltage held in the smoothing capacitor 6 is referred to as a "capacitor voltage" or "boosted voltage". A capacitor voltage detection signal $V_{dc}$ is input to the filter circuit 10c. The filter circuit 10c removes noise contained in the capacitor voltage detection signal $V_{dc}$. A filtered detection signal $V_{dc\_fil}$ is input to the processor 12a.

The processor 12a generates a control signal $C_s$ for controlling the switching element 4c on the basis of the detection signal $I_{dc\_fil}$ and the detection signals $V_{s\_fil}$ and $V_{dc\_fil}$, each of the detection signals having been filtered, and a carrier.

The processor 12a is an arithmetic means such as an arithmetic device, a microprocessor, a microcomputer, a central processing unit (CPU), or a digital signal processor (DSP). The memory 12b is a nonvolatile or volatile semiconductor memory such as a random access memory (RAM), a read only memory (ROM), a flash memory, an erasable programmable RCM (EPROM), or an electrically EPROM (EEPROM) (registered trademark). The memory 12b stores a program that executes functions of the processor 12a described later. The processor 12a sends and receives necessary information through an interface including an analog-to-digital (AD) converter (not illustrated), and the processor 12a executes the program stored in the memory 12b, thereby controlling the power conversion circuit 5. A result of calculation by the processor 12a is stored in the memory 12b.

Next, a basic operation of the converter device 100 according to the first embodiment will be described. First, when the switching element 4c is turned on, the output end of the rectifier circuit 2 is electrically short-circuited through the reactor 4a and the switching element 4c, and a current flows in the reactor 4a and the switching element 4c. This operation is referred to as a "power-supply short-circuit operation". Due to the power-supply short-circuit operation, the current flowing in the reactor 4a rises, and energy is accumulated in the reactor 4a. When the switching element 4c is turned off in this state, the current flowing in the reactor 4a decreases, and a voltage depending on L (di/dt) is generated in the reactor 4a. Here, "i" denotes the current that has been flowing in the reactor 4a at the time of turn-on, and here, "L" denotes inductance of the reactor 4a.

When the sum of an output voltage of the rectifier circuit 2 and a voltage of the reactor 4a becomes higher than the capacitor voltage, the backflow-preventing diode 4b conducts, a current flows toward the smoothing capacitor 6, and the smoothing capacitor 6 is charged. When the energy of the reactor 4a is completely released, the voltage of the reactor 4a drops, and when the sum of the output voltage of the rectifier circuit 2 and the voltage of the reactor 4a drops below the capacitor voltage, the backflow-preventing diode 4b commutates. Since the backflow-preventing diode 4b is connected so as to prevent the backflow of a current, the voltage of the smoothing capacitor 6 is maintained. The capacitor voltage rises above the power supply voltage by repeating these operations. As a result of the above operations, the smoothing capacitor 6 holds the boosted voltage required to drive the load 50.

Although FIG. 1 illustrates one booster circuit including a set of the reactor 4a, the backflow-preventing diode 4b, and the switching element 4c, there is no limitation to the configuration. The number of sets of the reactor 4a, the backflow-preventing diode 4b, and the switching element 4c may be two or more. That is, multiple booster circuits in which multiple sets of the reactor 4a, the backflow-preventing diode 4b, and the switching element 4c are connected in parallel may be used.

Furthermore, although the current detector 7 detects the current flowing in the reactor 4a in FIG. 1, there is no limitation to the configuration. A current detector may be arranged between the other end of the switching element 4c and the electrical wiring line 14b to detect a current flowing in the switching element 4c. An example of the current detector in that case is a CT or shunt resistor.

Figure 2:
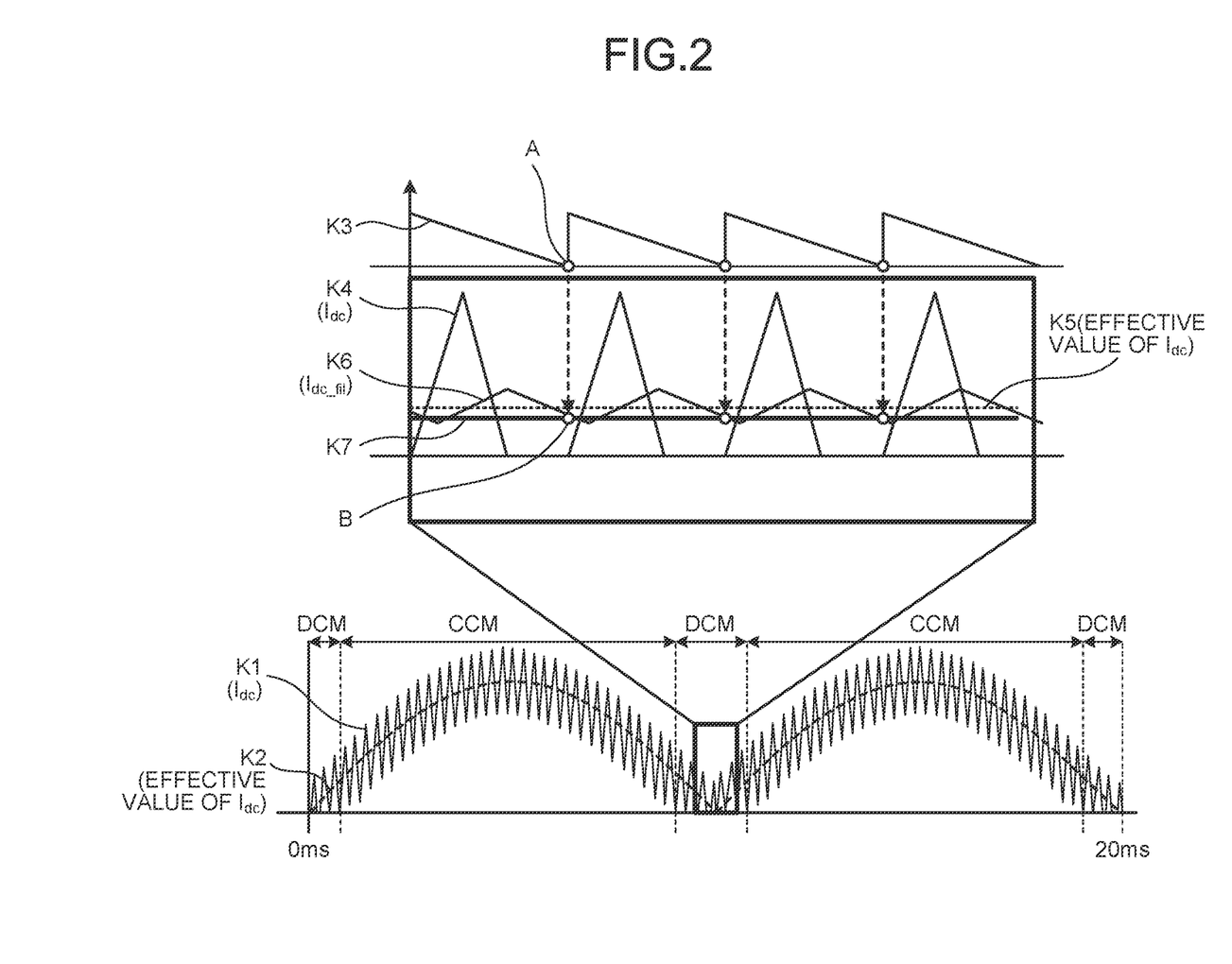
FIG. 2 is a first diagram illustrating various waveform examples used for explaining an operation of the first embodiment.

Next, an operation of a main part of the converter device 100 according to the first embodiment will be described. FIG. 2 is a first diagram illustrating various waveform examples used for explaining an operation of the first embodiment. Illustrated in a lower part of FIG. 2 are various examples of waveforms flowing in the reactor 4a when the converter device 100 according to the first embodiment is operated. The horizontal axis represents time and the vertical axis represents amplitude. On the horizontal axis, "20 ms" is time of one power supply period (in a case of 50 Hz). What is meant by "CCM" is a continuous mode, and what is meant by "DCM" is a discontinuous mode. Furthermore, in the lower part, a triangular waveform 1 illustrated in a solid line is the reactor current detection signal $I_{dc}$ input to the filter circuit 10a, and a sinusoidal waveform 2 illustrated in a broken line is an effective value of the detection signal $I_{dc}$.

In an upper part of FIG. 2, waveforms in the discontinuous mode are enlarged and illustrated. In the upper part, a sawtooth waveform 3 illustrated in a solid line is a carrier. Waveforms 4 and 5 are obtained by enlarging the waveforms K1 and 2 in the lower part, respectively. A waveform 6 is the detection signal $I_{dc\_fil}$ after the filtering by the filter circuit 10a. Point A indicates timing of AD conversion, and point B indicates timing of current detection. A waveform 7 illustrated in a thick solid line is a detection current taken into the processor 12a.

As illustrated in the waveform 4, there is a section where no current flows in the discontinuous mode, but, as illustrated in the waveform 6, the current waveform after the filtering has a smaller current change than, the waveform 4. As a result, a difference between the effective value of the detection signal $I_{dc}$ (waveform 5) and the detection current (waveform 7) taken into the processor 12a is small. Furthermore, it can be seen that substantially the same current value is taken into the processor 12a even if the timing of the current detection is different.

Figure 3:
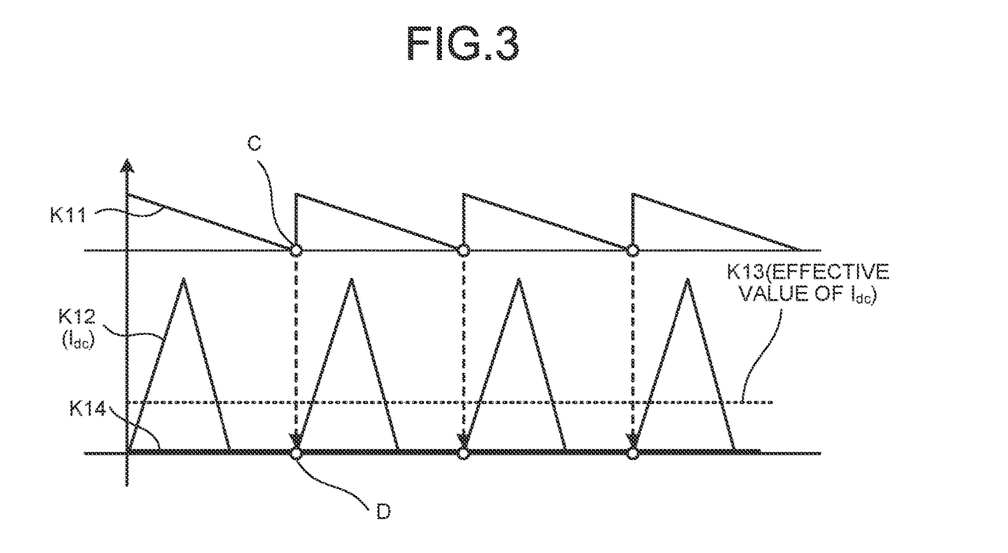
FIG. 3 is a diagram illustrating waveforms of a comparative example compared with FIG. 2.

FIG. 3 is a diagram illustrating waveforms of a comparative example compared with FIG. 2. Furthermore, FIG. 3 illustrates waveforms when the filter circuit 10a does not exist. In FIG. 3, a triangular waveform 12 illustrated in a solid line is the reactor current detection signal $I_{dc}$, and a waveform 13 illustrated in a broken line is an effective value of the detection signal $I_{dc}$. A waveform 14 illustrated in a thick solid line is a detection current taken into the processor 12a. As can be understood from the comparison between FIGS. 2 and 3, when the filter circuit 10a does not exist, a difference between the effective value of the detection signal $I_{dc}$ (waveform 13) and the detection current (waveform 14) taken into the processor 12a is large. Therefore, when the filter circuit 10a is not provided, it is difficult to obtain an accurate effective value of the detection current, especially in the discontinuous mode.

FIG. 3 illustrates an example of a case where the filter circuit 10a is not provided, but even in a case where the filter circuit 10a is provided, if the cut-off characteristic of the filter circuit 10a does not match the characteristic of the converter device 100, there may be a case where an accurate effective value of the detection current cannot be obtained. Explaining a situation in that case with reference to FIG. 2, the difference between the effective value of the detection signal $I_{dc}$ (waveform 5) and the detection current (waveform 7) taken into the processor 12a becomes large in the upper part of FIG. 2.

On the other hand, the cut-off characteristic of the filter circuit 10a in the first embodiment matches the characteristic of the converter device 100. The cut-off characteristic of the filter circuit 10a will be described later, and "thinning-out control", which is a feature of the control of the converter device 100, will be described below.

Figure 4:
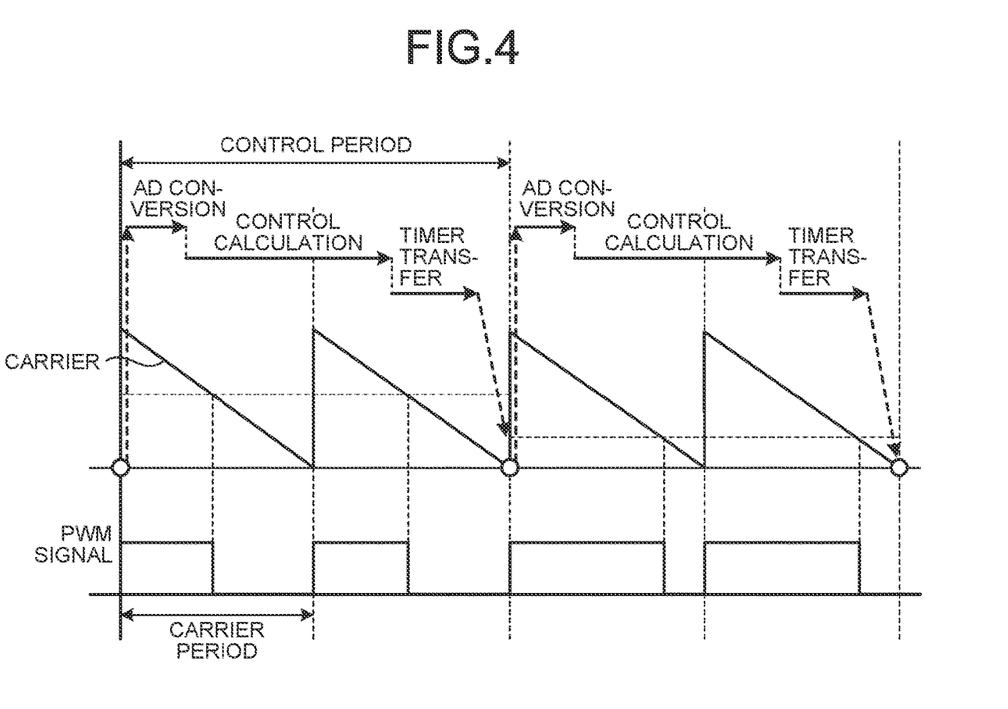
FIG. 4 is a second diagram illustrating various waveform examples used for explaining the operation of the first embodiment.

FIG. 4 is a second diagram illustrating various waveform examples used for explaining the operation of the first embodiment. FIG. 4 illustrates the concept of the thinning-out control in a time chart format. In the thinning-out control, as illustrated in FIG. 4, processes of AD conversion, control calculation, and timer transfer are performed in a time period of one control period. The AD conversion includes a process in which detection values of the current detector 7 and the voltage detectors 8 and 9, which are analog signals, are converted into digital signals. The control calculation includes a process of generating a pulse width modulation (PWM) signal for controlling the switching element 4c. The timer transfer is a data transfer process using a timer.

Within one control period, two periods of the carrier is output. In each carrier period within one control period, PWM signals with the same duty, that is, the same pulse width are output. Accordingly, in the thinning-out control, the switching element 4c is controlled with the carrier period.

In FIG. 1, the example is illustrated in which there is one booster circuit, and the detection signal is updated once for one control period. On the other hand, in a case where there are multiple booster circuits and each booster circuit has a current detector, the detection signal is updated multiple times for one control period depending on the number of booster circuits. For example, in a case where there are two booster circuits, the detection signal is updated twice for one control period.

FIG. 4 illustrates the example in which one control period is twice the carrier period, but there is no limitation to the example. One control period may be n times the carrier period. (n is an integer of 2 or more). Since n=1 is not included in the thinning-out control, one control period is longer than one carrier period. Accordingly, in the thinning-out control, the current detection by the current detector 7 is performed with a control period longer than the carrier period. The carrier period may be referred to as a "first period", and the control period may be referred to as a "second period".

Furthermore, the above relationship of time-domain can be paraphrased in frequency-domain. First, a repetition frequency of the control period is lower than a repetition frequency of the carrier period. Then, the repetition frequency of the control period may be 1/m times the repetition frequency of the carrier period (m is an integer of 2 or more).

Figure 5:
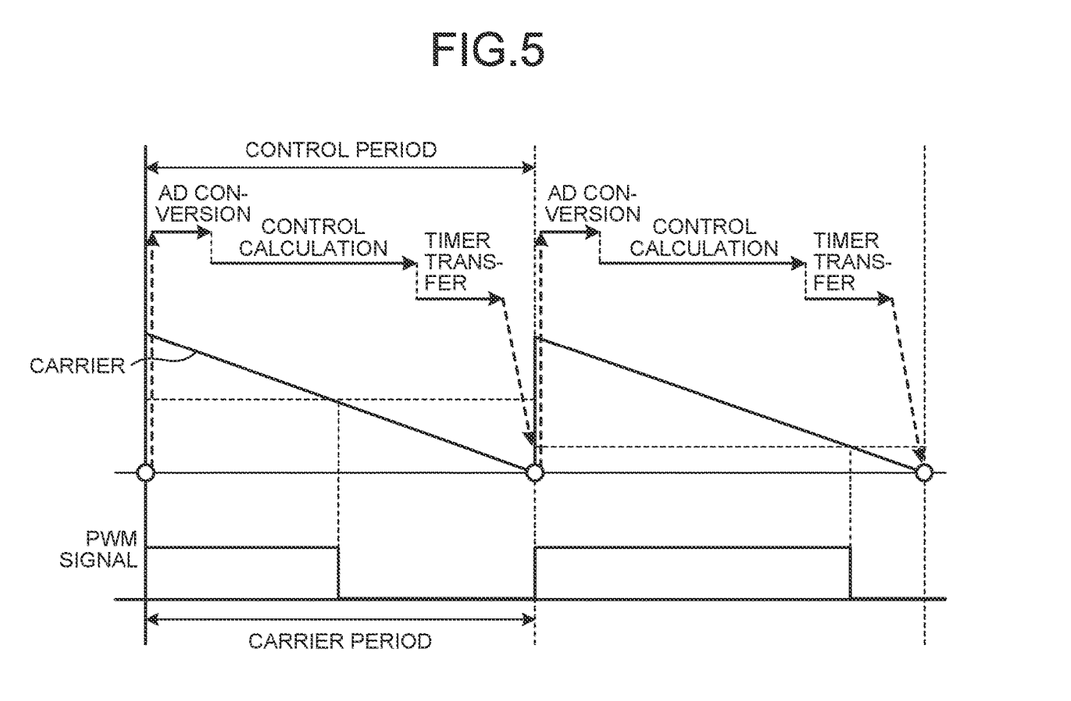
FIG. 5 is a diagram illustrating waveforms of a comparative example compared with FIG. 4.

FIG. 5 is a diagram illustrating waveforms of a comparative example compared with FIG. 4. FIG. 5 illustrates a case where the control period and the carrier period coincides with each other. The processes of AD conversion, control calculation, and timer transfer are performed within one control period as in FIG. 4, but within one control period, one PWM signal is output and multiple PWM signals are never output.

In a case where, for example, a microcomputer is used as the processor 12a, the control calculation may not be completable in one carrier period depending on the processing capacity of the microcomputer. In particular, when a switching speed increases, a carrier frequency as the repetition frequency of the carrier period becomes higher, and the above tendency becomes conspicuous. In such a case, the thinning-out control is effective in which a control frequency as the repetition frequency of the control period is set to be lower than the carrier frequency. That is, the thinning-out control is effective when the processing capacity of the processor 12a is not very high. If the thinning-out control adopted, high-speed switching control can be performed using an inexpensive microcomputer, so that the cost reduction of the converter device 100 can be achieved, including the cost reduction of the reactor 4a.

Figure 6:
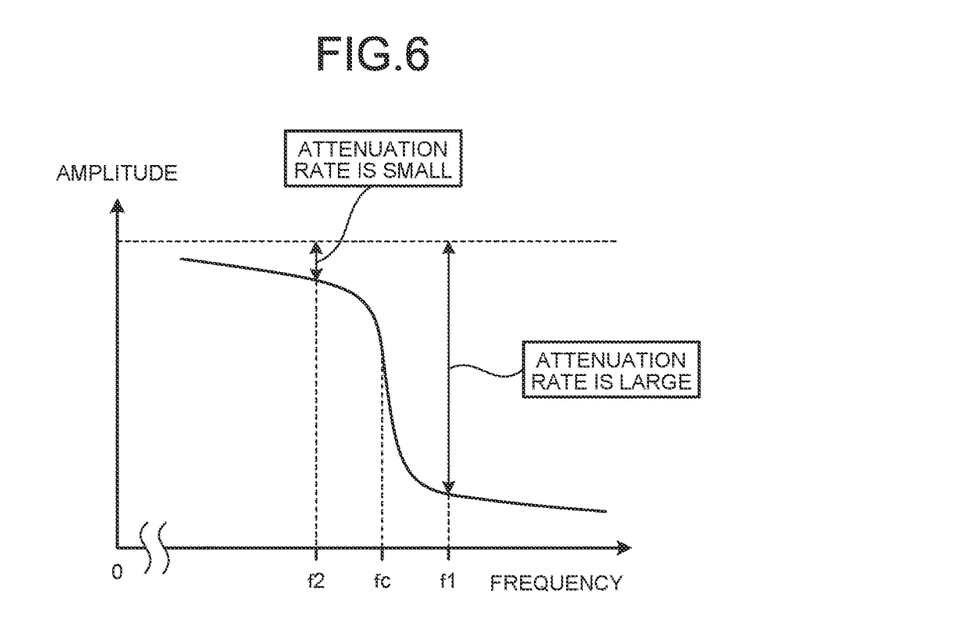
FIG. 6 is a diagram illustrating an example of a cut-off characteristic of a filter circuit in the first embodiment.

Next, the cut-off characteristic of the filter circuit 10a in the first embodiment will be described. FIG. 6 is a diagram illustrating an example of the cut-off characteristic of the filter circuit 10a in the first embodiment, and is an example of an LPF. In FIG. 6, the horizontal axis represents frequency and the vertical axis represents amplitude. Furthermore, fc represents the cut-off frequency of the filter circuit 10a, f1 represents the carrier frequency, and f2 represents the control frequency. As illustrated in FIG. 6, the carrier frequency f1 is higher than the cut-off frequency fc, and the control frequency f2 is lower than the cut-off frequency fc. Consequently, the attenuation rate of the carrier frequency f1 is larger than the attenuation rate of the control frequency f2, and conversely, the attenuation rate of the control frequency f2 is smaller than the attenuation rate of the carrier frequency f1.

By applying, as the filter circuit 10a, one having the cut-off characteristic illustrated in FIG. 6, it is possible to pass the repetition frequency component of the control period while cutting off the repetition frequency component of the carrier period. As a result, the waveform (waveform K6 in FIG. 2) output from the filter circuit 10a can be brought closer to the effective value of the waveform (waveform K5 in FIG. 2) input to the filter circuit 10a. Consequently, it is possible to prevent reduction in the detection accuracy of the reactor current detection signal $I_{dc}$, and to stabilize the operation of the converter device 100.

When the filter circuit 10a is an LPF using a capacitor and a resistor, the cut-off frequency fc thereof is expressed by the following formula (1).

$$fc = 1/(2\pi CR) \tag{1}$$

In the above formula (1), C represents a capacitance value of the capacitor, and R represents a resistance value of the resistor. At that time, as illustrated in FIG. 6, the cut-off frequency fc is set to be lower than the carrier frequency f1 and higher than the control frequency f2. As a specific example, in a case of the carrier frequency f1=100 [kHz] and the control frequency f2=50 [kHz], it is only required to perform setting as follows: R=2.0 [kΩ] and C=0.001 [uF]. In the case of this example, fc≈80 [kHz], so That the relationship illustrated in FIG. 6 is satisfied.

In the case of the above example, a frequency component of 50 Hz or 60 Hz which is a frequency of a commercial power supply (hereinafter, referred to as a "power supply frequency component") is included in a pass band of the filter circuit 10a. Therefore, in the detection signal $I_{dc\_fil}$ after the filtering by the filter circuit 10a, the bluntness of the waveform near the power supply frequency component can be reduced. Consequently, a detection delay of a detection value can be reduced.

Although the case where the filter circuit 10a is an LPF has been described in the above, there is no limitation to the LPF. A notch filter may be used instead of the LPF. In that case, the notch filter is only required to be configured to have a filter characteristic capable of cutting off the repetition frequency component of the carrier period.

As described above, according to the converter device of the first embodiment, the current detector detects a current with the second period longer than the first period in which the switching element is controlled. Then, the filter circuit filters the detection signal of the current detector, cuts off the repetition frequency component of the first period, and passes the repetition frequency component of the second period. This achieves an effect that it is possible to prevent reduction in the detection accuracy of the current value and to stabilize the operation of the device.

Although the filter characteristic of the filter circuit 10a to which the detection signal of the current detector 7 is input has been described in the first embodiment, the filter circuits 10b and 10c to which the detection signals of the voltage detectors 8 and 9 are respectively input may have a characteristic similar to the filter circuit 10a. Consequently, reduction in the detection accuracy of a voltage value can be prevented, and therefore, it is possible to contribute to further stabilization of the operation of the device.

Although a so-called single switch boost converter including one booster circuit such as that illustrated in FIG. 1, or a so-called interleaved converter including multiple booster circuits has been exemplified in the first embodiment, there is no limitation thereto. The single switch boost converter and the interleaved converter are each a type of converter that boosts a voltage on a direct-current side after rectification. There is a type of converter that boosts a voltage on an alternating-current side before rectification, that is, on an alternating-current power supply side, and this type of converter may be used. Examples of the type of converter that boosts the voltage on the alternating-current power supply side include a simple pulse amplitude modulation (PAM) converter, a multi-level converter, and a diode bridgeless converter. Each of these converters performs an operation of boosting a power supply voltage by subjecting a reactor arranged on an alternating-current power supply side to a power-supply short-circuit operation via at least one switching element, and can be used for the power conversion circuit 5 of the first embodiment.

Second Embodiment

In a second embodiment, a motor drive device including the converter device 100 described in the first embodiment will be described.

Figure 7:
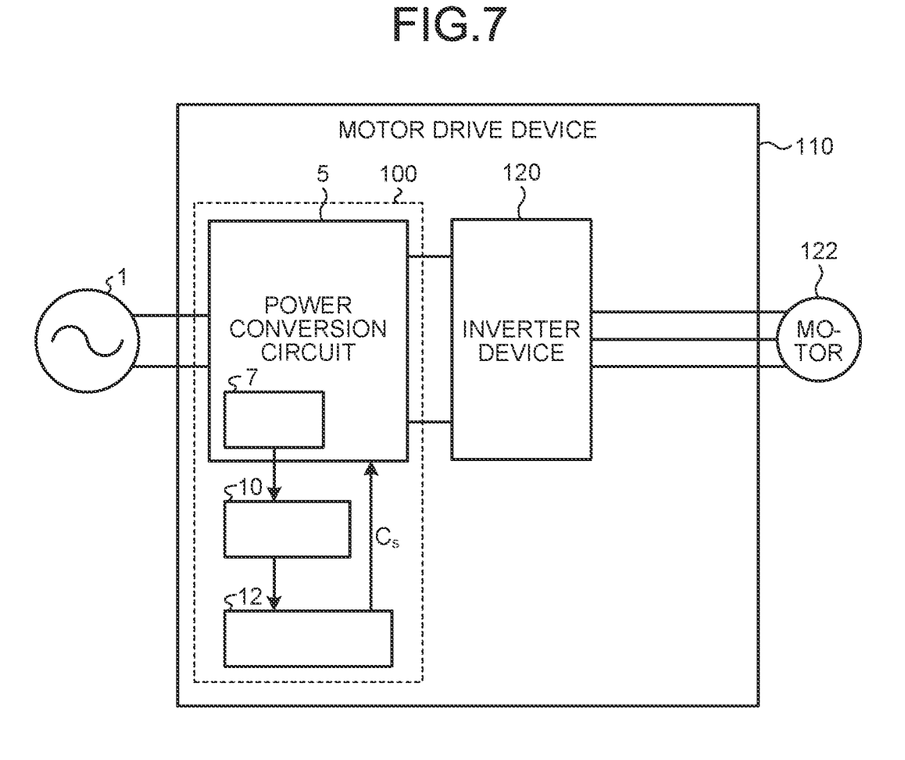
FIG. 7 is a diagram illustrating an example configuration of a motor drive device according to a second embodiment.

FIG. 7 is a diagram illustrating an example configuration of a motor drive device 110 according to the second embodiment. The motor drive device 110 according to the second embodiment illustrated in FIG. 7 includes the converter device 100 illustrated in FIG. 1 and an inverter device 120. As described above, the converter device 100 is a device that converts alternating-current power supplied from the alternating-current power supply 1 into direct-current power. The inverter device 120 is a device that converts direct-current power supplied from the converter device 100 into alternating-current power.

A motor 122 is connected to an output side of the inverter device 120. The inverter device 120 drives the motor 122 by supplying the converted alternating-current power to the motor 122.

The motor drive device 110 illustrated in FIG. 7 can be applied to products such as blowers, compressors and air conditioners. Although FIG. 7 exemplifies a case where an instrument driven by the motor drive device 110 is the motor 122, there is no limitation to the example. The inverter device 120 is a device that supplies alternating-current power, and the instrument is only required to be an instrument to which alternating-current power is input, and may be an instrument other than the motor 122.

In a load (not illustrated) connected to the motor 122, when the load fluctuates, a motor current flowing in the motor 122 also fluctuates. As a result, a reactor current in the converter device 100 also fluctuates. As described above, the converter device 100 according to the first embodiment can prevent reduction in the detection accuracy of the reactor current and stabilize the operation of the device. Therefore, even if the motor current fluctuates, stable direct-current power is supplied to the inverter device 120 from the converter device 100. Accordingly, the motor drive device 110 can stably drive the motor 122.

Figure 8:
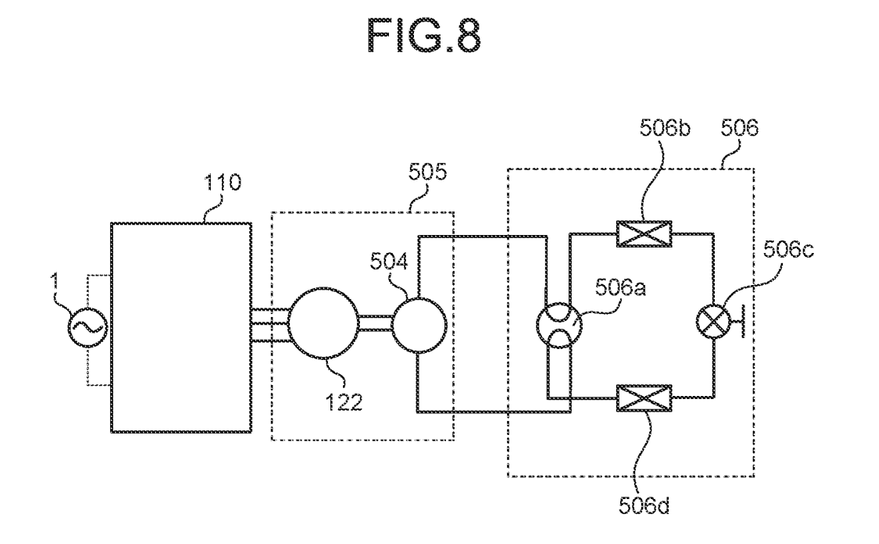
FIG. 8 is a diagram illustrating an example in which the motor drive device illustrated in FIG. 7 is applied to an air conditioner.

FIG. 8 is a diagram illustrating an example in which the motor drive device 110 illustrated in FIG. applied to an air conditioner. The motor 122 is connected to an output side of the motor drive device 110, and the motor 122 is connected to a compression element 504. A compressor 505 includes the motor 122 and the compression element 504. A refrigeration cycle unit 506 includes a four-way valve 506a, an indoor heat exchanger 506b, an expansion valve 506c, and an outdoor heat exchanger 506d.

A flow path of a refrigerant circulating inside the air conditioner is configured as follows: the refrigerant flows out from the compression element 504, and returns to the compression element. 504 via the four-way valve 506a, the indoor heat exchanger 506b, the expansion valve 506c, the outdoor heat exchanger 506d, and again via the four-way valve 506a. The motor drive device 110 receives power supplied from the alternating-current power supply 1 and rotates the motor 122. The rotation of the motor 122 makes it possible for the compression element 504 to execute a compression operation of the refrigerant, and to circulate the refrigerant inside the refrigeration cycle unit 506.

The motor drive device according to the second embodiment includes the power supply device according to the first embodiment. Consequently, the effect described in the first embodiment can be achieved in a product to which the motor drive device according to the second embodiment is applied.

The configurations described in the embodiments above are merely examples of the content of the present invention and can be combined with other known technology and part thereof can be omitted or modified without departing from the gist of the present invention.

The invention claimed is:

1. A converter device comprising:
   a power conversion circuit including a reactor and at least one switching element, the power conversion circuit converting a voltage of alternating-current power supplied from an alternating-current power supply into a direct-current voltage, and outputting the direct-current voltage;
   a current detector detecting a current flowing in the reactor or the switching element;
   a filter circuit filtering a first signal detected by the current detector; and
   a control unit generating a control signal on a basis of a carrier and a second signal generated by the filter circuit and controlling, on a basis of the control signal and with a first period, the switching element, the first period being a period of the carrier, wherein the filter circuit cuts off a repetition frequency component in the first period and passes a repetition frequency component in a second period, the second period being longer than the first period, wherein the current detector detects the current with the second period.

2. The converter device according to claim 1, wherein the control unit updates the first signal at least once for one period of the second period.

3. The converter device according to claim 1, wherein the filter circuit is a low pass filter.

4. The converter device according to claim 1, wherein the filter circuit is a notch filter.

5. The converter device according to claim 1, wherein the switching element is made with a wide bandgap semiconductor.

6. The converter device according to claim 5, wherein the wide bandgap semiconductor is silicon carbide, gallium nitride, gallium oxide, or diamond.

7. A motor drive device comprising: the converter device according to claim 1; and an inverter device converting direct-current power output from the converter device into alternating-current power.

8. An air conditioner comprising: the motor drive device according to claim 7.

* * * * *